United States Patent
Gomi et al.

(10) Patent No.: US 11,370,712 B2
(45) Date of Patent: Jun. 28, 2022

(54) ZINC OXIDE VARISTOR AND METHOD FOR MANUFACTURING SAME

(71) Applicants: KOA CORPORATION, Nagano (JP); JFE MINERAL COMPANY, LTD., Tokyo (JP)

(72) Inventors: Yoji Gomi, Nagano (JP); Kenichi Iguchi, Nagano (JP); Etsurou Udagawa, Tokyo (JP); Yuko Echizenya, Tokyo (JP); Yoshimi Nakata, Tokyo (JP)

(73) Assignees: KOA Corporoation, Nagano (JP); JFE Mineral Company, Ltd., Tokyo (JP)

( * ) Notice: Subject to any disclaimer, the term of this patent is extended or adjusted under 35 U.S.C. 154(b) by 546 days.

(21) Appl. No.: 16/467,624

(22) PCT Filed: Dec. 7, 2017

(86) PCT No.: PCT/JP2017/043953
§ 371 (c)(1),
(2) Date: Jun. 7, 2019

(87) PCT Pub. No.: WO2018/105689
PCT Pub. Date: Jun. 14, 2018

(65) Prior Publication Data
US 2019/0322588 A1 Oct. 24, 2019

(30) Foreign Application Priority Data
Dec. 7, 2016 (JP) .............................. JP2016-237718

(51) Int. Cl.
*H01B 1/08* (2006.01)
*C04B 35/453* (2006.01)
(Continued)

(52) U.S. Cl.
CPC .............. *C04B 35/453* (2013.01); *C01G 9/02* (2013.01); *H01B 1/08* (2013.01); *H01C 7/12* (2013.01);
(Continued)

(58) Field of Classification Search
CPC .......... H01B 1/08; H01C 7/12; C04B 35/453; C01G 9/02
See application file for complete search history.

(56) References Cited

U.S. PATENT DOCUMENTS 5,382,385 A * 1/1995 Ochi ...................... H01C 7/112
252/519.5
8,216,544 B2 7/2012 Ando et al.
(Continued)

FOREIGN PATENT DOCUMENTS

JP  S58-124204 A  7/1983
JP  2001-220136 A  8/2001
(Continued)

OTHER PUBLICATIONS

Corrected English language translation of JP S58-124204 (pub Jul. 1983).*
(Continued)

*Primary Examiner* — Mark Kopec
(74) *Attorney, Agent, or Firm* — Carrier Blackman & Associates, P.C.; Joseph P. Carrier; Anne G. Sabourin

(57) ABSTRACT

Focus is on zinc oxide itself, which is a base material for a zinc oxide varistor (laminated varistor), wherein specified quantities of additives are added to a zinc oxide powder having a crystallite size of 20 to 50 nm, grain diameter of 15 to 60 nm found using the specific surface area BET method, untamped density of 0.38 to 0.50 g/cm³, and tap density of 0.50 to 1.00 g/cm³. This allows securing of uniformity, high compactness, and high electrical conductivity of a zinc
(Continued)

oxide sintered body, and provision of a zinc oxide varistor having high surge resistance.

12 Claims, 5 Drawing Sheets

(51) Int. Cl.
  *C01G 9/02* (2006.01)
  *H01C 7/12* (2006.01)
(52) U.S. Cl.
  CPC ...... *C01P 2002/60* (2013.01); *C01P 2004/03* (2013.01); *C01P 2004/64* (2013.01); *C01P 2006/10* (2013.01); *C01P 2006/11* (2013.01); *C01P 2006/40* (2013.01); *C04B 2235/3217* (2013.01); *C04B 2235/3224* (2013.01); *C04B 2235/3262* (2013.01); *C04B 2235/3275* (2013.01); *C04B 2235/3279* (2013.01); *C04B 2235/3284* (2013.01); *C04B 2235/3286* (2013.01); *C04B 2235/3298* (2013.01); *C04B 2235/3409* (2013.01); *C04B 2235/781* (2013.01); *C04B 2235/85* (2013.01)

(56) References Cited

U.S. PATENT DOCUMENTS

| | | | |
|---|---|---|---|
| 8,399,092 B2* | 3/2013 | Sueda | C01G 9/02 428/402 |
| 2010/0136337 A1* | 6/2010 | Ando | H01C 7/112 428/402 |
| 2021/0238052 A1* | 8/2021 | Ishida | C01G 9/02 |
| 2021/0354995 A1* | 11/2021 | Udagawa | C04B 35/453 |

FOREIGN PATENT DOCUMENTS

| | | |
|---|---|---|
| JP | 2003-119080 A | 4/2003 |
| JP | 2007-008805 A | 1/2007 |
| JP | 2008-218749 A | 9/2008 |
| JP | 2012-025619 A | 2/2012 |
| JP | 2013-189369 A | 9/2013 |
| JP | 2015-038014 A | 2/2015 |

OTHER PUBLICATIONS

Katsuyama Tomoyuki, Supervisor: Tetsuya Yamamoto, "State-of-the-Art Research and Prospective of Zinc Oxide", 3 Particles (CMC Publishing Co., Ltd.,) published on Jan. 31, 2011, ISBN978-4-7813-0320-8, 16 pages, (No English language translation provided).

* cited by examiner

ZINC OXIDE VARISTOR AND METHOD FOR MANUFACTURING SAME

TECHNICAL FIELD

The present invention relates to a zinc oxide varistor for protecting a circuit from a lightening induced surge etc., for example, and a manufacturing method thereof.

BACKGROUND ART

Usage environments of electronic components mounted on electronic devices have been changing remarkably due to the rapid spread of the electronic devices in various fields. For example, due to revisions of standards and various applications for automobiles, industrial equipment, etc., demands for higher performance etc. of electronic components that were unexpected in the past have been increasing. As a result, electronic components for protecting vulnerable electronic circuits from unexpected noise and pulses such as various surges and pulse noise are in demand. Moreover, out of duly consideration of operating environmental influence of sulfurization, water condensation, etc., provision of electronic components having not only high initial functions but also high continuous reliability is essential.

A varistor conventionally known as a non-linear resistance element is used for protecting a vulnerable circuit from abnormal voltages such as various surges and pulse noise in wide fields and applications as mentioned above so as to secure stability of operation and to provide a counter measure against ESD (electrostatic discharge). Moreover, while many electronic components have been devised to save component mounting space and be thinner and shorter, the varistor is not an exception. While miniaturization and reduction in cost of the varistor is desired, further reduction in mounting space and size has reached its limit under the present conditions.

Electrical properties and reliability of the varistor obtained change greatly according to different combination of additives and different dosages thereof. For example, grain growth may fluctuate at the time of sintering due to the blending ratio of base materials to be added. Large differences in clamping voltage, which is a basic characteristic of the varistor, and circuit protection capability at the time of applying a large surge occur as a result.

Here, ceramics and zinc oxide (ZnO) used as sintering members are described below.

Zinc oxide has characteristics such as a higher zinc steam pressure and easier grain growth than those of other ceramic powders such as aluminum oxide and zirconium oxide. The base powder has been widely used as a white pigment from long ago, manufacturing methods of a French method and a German method are established, and high-quality powders are supplied at a low cost. However, smallest grains of these powders are as little as approximately 0.3 to 0.6 μm in size, and densification of the base material for a sintering member at a low temperature cannot be expected, and thus obtained sintered grains are large in size.

In recent years, powders at a grade of 0.3 μm or less, which are synthesized through a wet process, primarily for cosmetics are also supplied at a relatively low cost. While it is important for the zinc oxide powder of the base material to be small in grain size in order to carry out low-temperature sintering not using the formation of melt or a sintering additive, there is no proposal for an effective means to deal with grain growth control, which is one of the problems of the present invention. Problems of the present invention will be made clear below mostly from the patent documents.

In Patent Document 1, zinc oxide obtained by dripping a carbon alkaline agent into water-soluble zinc carboxylate and controlling it until reaching a constant pH forms tubular secondary particles, which are made through its primary particles aggregating, and is intended for cosmetics that exhibit excellent ultraviolet ray shielding performance and transparency. However, tap density is low and grain growth is large due to the tubular or precursor-shaped mark. It is effective for concealment, which is required for cosmetics, but is unsuitable as a base material for a sintered body. More specifically, acetic acid is added to a zinc chloride aqueous solution and dissolved, and a sodium carbonate solution is dripped therein until reaching pH8. Once the obtained precipitate is passed through a filter and rinsed with water, it is dried and heat-treated at 400° C. for three hours, thereby obtaining a zinc oxide powder.

Patent Document 2 relates to basic zinc chloride in flake form having excellent concealing property. While this document provides a technology with excellent control of crystallinity, form, and size, a large quantity of chlorine remains even if it is made into zinc chloride through heat treatment. Mainly regarding aspect control, it is unsuitable as a sintering base material due to the large flake form having an aspect ratio of 10 or greater, easiness of sintering into the plate shape at the time of dechlorination and dewatering, largeness of the sintering grain size, and largeness of voids at the time of sintering.

Patent Document 3 relates to manufacturing of a thermistor, with which improvement in performance as an exhaust gas temperature sensor for automobiles is anticipated. This is manufactured through wet synthesis (spray pyrolysis) of a precursor allowing both uniformity in composition and dense structure of a thermistor sintering member or multiple oxide, and heat treatment of the obtained powder having an average grain diameter of 30 to 50 nm, resulting in improvement in tap density by using grain growth up to an average grain diameter of 0.1 to 1 μm. Use of grown grains may reduce the amount of binder used, thereby obtaining a dense sintered body having a near net shape. However, with this method, a lower sintering temperature and control of grain growth cannot be expected.

Patent Document 4 relates to manufacturing of granulated powder having a high sphericity, and provides a filler having a high filling rate used in grease and paint. In manufacturing filler particles, a surfactant or binder is used in an organic solvent so as to make a slurry without specifying zinc oxide primary particles to be used, and the slurry is dried using a spray dryer, making sphericalness (major axis/minor axis) be 1.00 to 1.10 and median diameter (D50) be 20 to 100 μm. Moreover, making the size ratio of D90/D10 be 2.8 or less gives few extremely large particles, resulting in improvement of filling rate, reduction in repose angle, and provision of an excellent filler material. However, the granulated powder obtained using this method is unsuitable as a sintered material. This is because at the time of sintering, spherical and particle-shaped powder (filler) shrinks, thereby forming large voids. Such voids may be reduced through sintering at a high temperature for a long time, but cannot be eliminated.

In Patent Document 5, zinc oxide powder and zinc oxide multiple oxide powder intended for a sputtering target is provided. The sputtering target requires high density, high heat conductivity, and a uniform structure. With this technology, capsule HIP (hot isostatic pressing and sintering) is used as a sintering method for densification, and as a resulting problem, the capsule filling rate (base powder tap density/theoretical density) is set to 50% or higher. A powder having a tap density of 2.8 g/cm$^3$ that is achieved by sintering zinc oxide powder having a tap density of less than 50% at 900 to 1400° C. in open air is used as a means to solve the problem. While it is the same method as in Patent Document 3 since the method of improving tap density is heat treatment, sintering using the capsule HIP method allows further prevention of volatilizing zinc oxide and also allows a lower sintering temperature than with open air sintering. It can be called technology that realizes denseness, high strength and low grain growth. However, this method provides a sintering material assuming the capsule HIP method.

In Non-Patent Document 1, flower petal-shaped zinc oxide having both high ultraviolet ray protection and high transparency is manufactured through titration under the conditions of a high temperature and a constant pH. In this case, card-shaped precursor basic zinc carbonates connect to each other and grow into flower petal shapes. When that is converted to zinc oxide through heat treatment, its form is maintained. Therefore, since seed crystals become large and grain growth increases remarkably, a uniform sintered body cannot be obtained. More specifically, a zinc chloride solution and an alkaline solution (liquid mixture of sodium carbonate and sodium hydroxide) are dripped into water kept at 60° C. so as to meet the requirement of a constant pH. Once the obtained precipitate is passed through a filter and rinsed with water, it is dried and the dry matter is sintered at 400° C., thereby obtaining zinc oxide.

PRIOR ART DOCUMENTS

Patent Documents

Patent Document 1: JP 2007-8805A
Patent Document 2: JP 2015-038014A
Patent Document 3: JP 2003-119080A
Patent Document 4: JP Patent No. 5617410
Patent Document 5: JP 2013-189369A Non-Patent Documents Non-Patent Document 1: "State-of-the-Art Research and Prospective of Zinc Oxide", 3. Particles, KATSUYAMA Tomoyuki (CMC Publishing CO., LTD.), published on Jan. 31, 2011.

DISCLOSURE OF THE INVENTION

Problem to be Solved by the Invention

As described above, a varistor has a characteristic in that it can obtain the essential capacities by adding various additives and controlling grain growth and degree of sintering. However, achieving a varistor having ideal, excellent basic characteristics is difficult. It is impossible to change the characteristics of the zinc oxide base material itself, which occupies approximately 90% of the varistor base material and is an essential material for the varistor characteristics. Conventionally, the characteristics have been secured through interaction between the zinc oxide base material and various additives.

Generally, zinc oxide has characteristics of a higher zinc vapor pressure, easier grain growth, etc. than other ceramic powders such as aluminum oxide and zirconium oxide. Most zinc oxide is manufactured by the aforementioned French method, wherein the grain size is approximately 0.3 to 0.6 µm, and there are many distortions and anisotropic parts within the crystallites. Therefore, the already existing varistor using these materials has problems of abnormal grain growth and instable grain form generated during the sintering process, and regarding tolerance to surge pulses such as lightening or the like, which is an important characteristic of a varistor, load concentration occurs due to nonuniformity of grains when a high voltage pulse surge is applied, resulting in significant degradation of the characteristics.

As a countermeasure for these problems, performance improvement has been attempted by devising additive composition and manufacturing process of the conventional varistor, but sufficient performance has not yet been secured.

In light of these problems, the present invention aims to provide a highly reliable zinc oxide varistor that can be made compact and reduce cost.

Means of Solving the Problem

As means for achieving the above aim and to resolve the above problems, a zinc oxide varistor according to the present invention is characterized by including: zinc oxide (ZnO) as a main component, one or more kinds of additives selected as a grain boundary forming component from a group including bismuth (Bi) and praseodymium (Pr), and one or more kinds of additives selected as a transition metal element from a group including cobalt (Co), manganese (Mn) and nickel (Ni). The zinc oxide has a crystallite size of 20 to 50 nm found by X-ray diffraction, grain diameter of 15 to 60 nm found using a specific surface area BET method, untamped density of 0.38 to 0.50 g/cm$^3$, and tap density of 0.50 to 1.00 g/cm$^3$, more preferably within the range of 0.60 to 1.00 g/cm$^3$.

Alternatively, a zinc oxide varistor according to the present invention is characterized by including: zinc oxide (ZnO) as a main component, one or more kinds of additives selected as a grain boundary forming component from a group including bismuth (Bi) and praseodymium (Pr), and one or more kinds of additives selected as a transition metal element from a group including cobalt (Co), manganese (Mn) and nickel (Ni). The zinc oxide has median diameter of 30 to 60 nm found using a dynamic scattering method, cumulant diameter of 40 to 82 nm, and cumulant polydispersity index of 0.05 to 0.20, more favorably within the range of 0.05 to 0.15, even more favorably within the range of 0.05 to 0.12.

Alternatively, for example, it may be characterized in that crystallite size is 70 to 1200 nm when powder of the zinc oxide is sintered at 1000° C., and crystallite size is 75 to 170 nm when sintered at 1150° C. Further alternatively, for example, it may be characterized in that increasing rate of the crystallite size of the zinc oxide by sintering within the range of 1000° C. and 1150° C. is 10% or less. Yet even further alternatively, for example, it may be characterized in that one or more kinds of donor elements including aluminum (Al), boron (B), and gallium (Ga) is further added.

Moreover, as means for resolve the above problems, a manufacturing method of a zinc oxide varistor according to the present invention is characterized by including the steps of: manufacturing basic zinc carbonate slurry that is a first precursor of zinc oxide (ZnO) powder; obtaining from the first precursor a dried powder of basic zinc carbonate that is a second precursor of zinc oxide (ZnO) powder; obtaining zinc oxide (ZnO) through heat treatment of the second precursor; manufacturing a mixed material resulting from adding a predetermined additive to the zinc oxide (ZnO); and forming a varistor element for a zinc oxide varistor from the mixed material.

For example, the manufacturing method of a zinc oxide varistor is further characterized in that the zinc oxide varistor includes zinc oxide (ZnO) as a main component, one or more kinds of additives selected as a grain boundary forming component from a group including bismuth (Bi) and praseodymium (Pr), and one or more kinds of additives selected as a transition metal element from a group including cobalt (Co), manganese (Mn) and nickel (Ni). The zinc oxide has a crystallite size of 20 to 50 nm found by X-ray diffraction, grain diameter of 15 to 60 nm found using the specific surface area BET method, untamped density of 0.38 to 0.50 g/cm$^3$, and tap density of 0.50 to 1.00 g/cm$^3$, more preferably within the range of 0.60 to 1.00 g/cm$^3$.

Further, the manufacturing method of a zinc oxide varistor is further characterized in that the zinc oxide varistor includes zinc oxide (ZnO) as a main component, one or more kinds of additives selected as a grain boundary forming component from a group including bismuth (Bi) and praseodymium (Pr), and one or more kinds of additives selected as a transition metal element from a group including cobalt (Co), manganese (Mn) and nickel (Ni). The zinc oxide has median diameter of 30 to 60 nm found using a dynamic scattering method, cumulant diameter of 40 to 82 nm, and cumulant polydispersity index of 0.05 to 0.20, more favorably within the range of 0.05 to 0.15, even more favorably within the range of 0.05 to 0.12.

For example, the manufacturing method of a zinc oxide varistor is further characterized in that one or more kinds of donor elements including aluminum (Al), boron (B), and gallium (Ga) is further added.

Results of the Invention

According to the present invention, a zinc oxide varistor is provided having uniform sintered grain size and high compactness in a zinc oxide sintered body, and also having excellent surge current resistance and low clamping voltage while securing high electric conductivity.

BRIEF DESCRIPTION OF DRAWINGS

In FIG. 1, a photograph with a reference A indicates Working Example 1 using ammonium carbonate as a carbonic acid source; a photograph with a reference B indicates Comparative Example 1 using sodium hydrogen carbonate as a carbonic acid source; and a photograph with a reference C indicates Comparative Example 3 using the synthesis method according to Patent Document 1;

DESCRIPTION OF EMBODIMENTS

Figure 1:
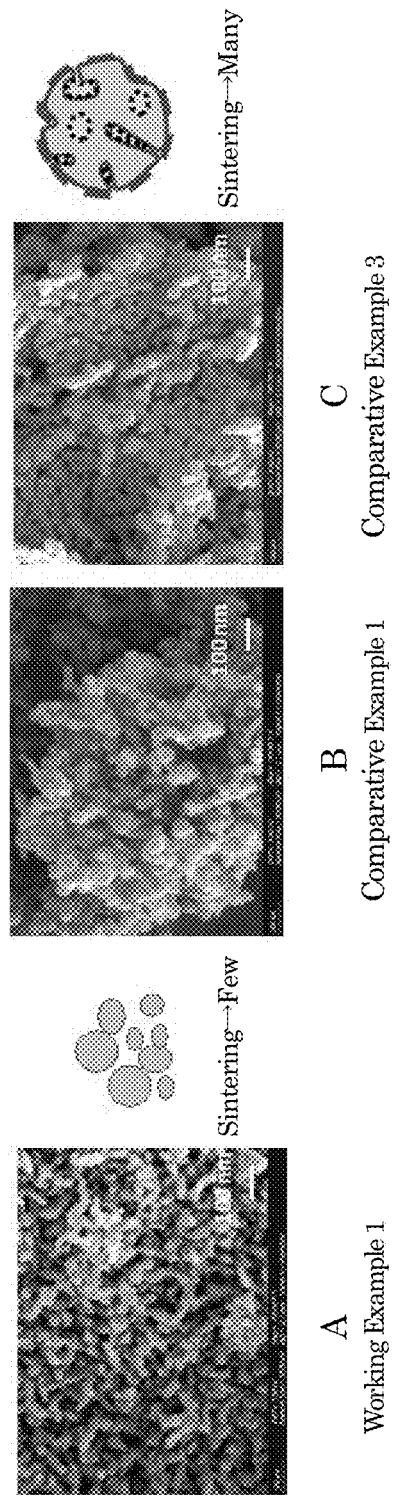
FIG. 1 shows SEM photographs for evaluating a connection state of zinc oxide powder at the time of heat treatment (decarbonation, dehydration) in Working Example 1, Comparative Example 1, and Comparative Example 3. Ultra-low accelerating SEM (acceleration voltage 3 kV) is used.

An embodiment according to the present invention is described in detail below with reference to accompanying drawings.

1. Zinc Oxide Powder
[Form of Zinc Oxide Powder]

(1) When zinc oxide powder used for the zinc oxide varistor of the present invention has a crystallite size of 20 to 50 nm found through X-ray diffraction (hereafter, simply referred to as crystallite size), and grain diameter found using the BET method (hereafter, referred to as BET diameter) is 15 to 60 nm, untamped density is 0.38 to 0.50 g/cm$^3$, and tap density is 0.50 to 1.00 g/cm$^3$, more preferably within the range of 0.60 to 1.00 g/cm$^3$.

Here, untamped density is found by taking the mass when zinc oxide powder is freely dripped into a standing 100 ml container using the method stipulated in JISR 9301-2-3. This mass is then divided by the volume of the container, giving the value of untamped density.

Tap density denotes bulk density resulting from the maximum number of taps when filling the same container being within 500 times.

As will be described later in a working example and comparative examples, the zinc oxide powder used for the zinc oxide varistor of the present invention has a higher tap density than zinc oxide powder of the comparative examples obtained by conventional technology. Due to the characteristics of the form of the zinc oxide powder used for the zinc oxide varistor of the present invention, the filling density becomes high and contact points among grains increase at the time of making a press-molded body or a thick film-molded body using a paste. This allows achievement of a dense sintered body with little shrinkage even at a low temperature of 1000° C. or less. Moreover, there is little grain growth even if sintering is performed at a high temperature of 1000° C. or higher. The sintered body obtained through sintering has a small sintered grain size and therefore has high density and high strength.

(2) The grain diameter of the zinc oxide powder used for the zinc oxide varistor of the present invention may be regulated by median diameter of 30 to 60 nm, cumulant diameter of 40 to 82 nm, and cumulant polydispersity index of 0.05 to 0.20, more preferably within the range of 0.05 to 0.15, and even more preferably within the range of 0.05 to 0.12, which are found using a dynamic scattering method. Those are characteristics of the zinc oxide powder used for the zinc oxide varistor of the present invention showing sintering behavior as described above.

Here, according to the dynamic scattering method, particles scattering throughout a solution (microparticles typically have Brownian motion, which is slower with larger particles and faster with smaller particles) are irradiated with a laser beam, and the resulting scattered light (fluctuation corresponding to speed of each Brownian motion) is observed and measured using a photodetector. The solution is measured at ambient temperature using hexametaphosphoric acid as a dispersant in ion exchanged water.

The meridian diameter is a grain diameter corresponding to 50% of an integrated analysis value.

The cumulant diameter is a mean diameter based on the cumulant operation that presumes an autocorrelation function to be a distribution with one peak.

The cumulant polydispersity index indicates the scale of distribution spread.

[Sintering Characteristics of Zinc Oxide Powder]

(3) From the results of quantitative observation of particles on sintered body surfaces given later in Table 4 of the working example and comparative examples, in which crystallite size and the number of SEM observed particles sintered at 1000° C. are compared with those sintered at 1150° C., the zinc oxide powder used for the zinc oxide varistor of the present invention shows 8% increase in crystallite size while 60% decrease in the number of SEM observed particles. This means that the grain growth is remarkably more controlled than in the comparative examples. This also shows that the zinc oxide powder used for the zinc oxide varistor of the present invention is suitable for obtaining a highly dense, highly strong sintered body.

The method of quantitative observation of particles on a sintered body surface using SEM is as follows. This method photographs at a magnification of 5 k a sintered body surface using SEM (S-4300 manufactured by Hitachi Ltd.) so as to count the number of particles within the visual field.

[Manufacturing Method of Zinc Oxide Powder]

While method of manufacturing the zinc oxide powder used for the zinc oxide varistor of the present invention that is regulated by the above-given characteristic form is not limited, an exemplary manufacturing method is given below (Basic zinc carbonate having ammonium carbonate as a carbonic acid source is used as a precursor.)

Figure 2:
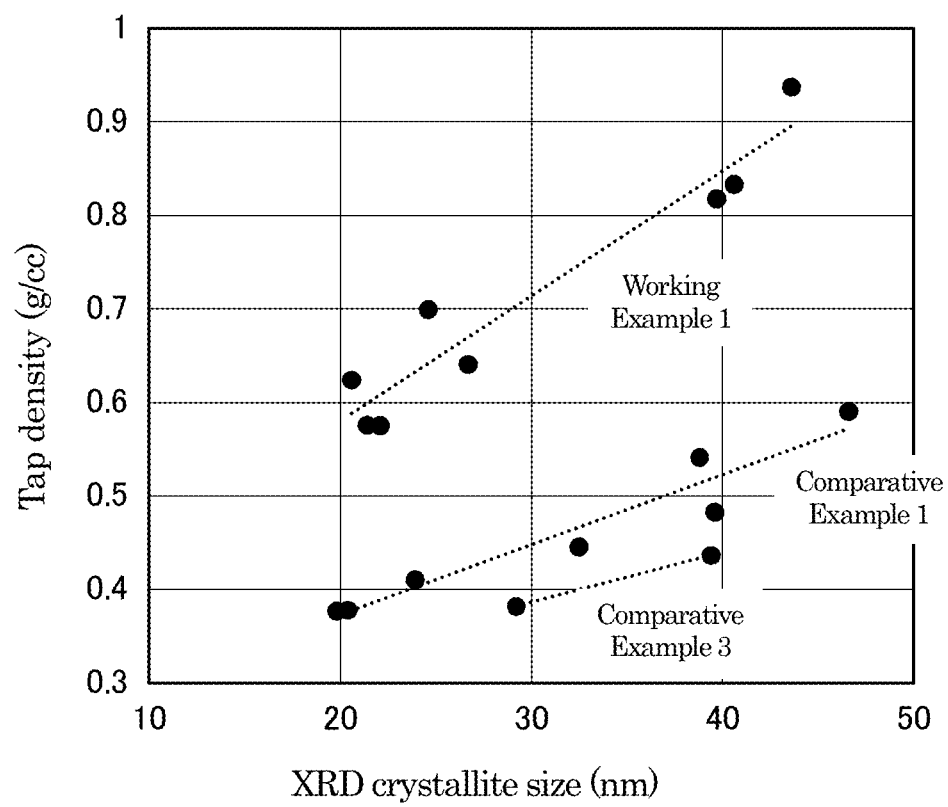
FIG. 2 is a graph illustrating relationships between crystallite size and tap density according to Working Example 1 and Comparative Examples 1 and 3.

(4) Relationships between crystallite size and tap density of zinc oxide powder obtained through heat treatment of basic zinc carbonate having ammonium carbonate as a carbonic acid source, which is used for synthesis, are illustrated in FIG. 2. When using ammonium carbonate, approximately 1.5 times the tap density can be achieved in the case where the crystallite size is the same, which is found by comparing to Comparative Example 1 in which only the ammonium carbonate is changed to sodium hydrogen carbonate, and also comparing to Comparative Example 3 in which synthesis is carried out having pH 8.5 at 60° C. according to Patent Document 1 and Non-Patent Document 1. The reason for the tap density to increase is still unclear, but the fact that the coagulation or connecting state is negligible after heat treatment for decarbonation and dehydration, as illustrated in the SEM photographs of FIG. 1, may be regarded as one of the causes. Hereafter, basic zinc carbonate as a starting material for the zinc oxide powder may be referred to as a precursor for the zinc oxide powder, or simply a precursor.

(5) The zinc oxide powder used for the zinc oxide varistor of the present invention results from using basic zinc carbonate (mainly hydrozincite) that is a kind of basic zinc salt as a precursor, and decarbonating and dehydrating it through heat treatment so as to manufacture zinc oxide. The higher the heat treatment temperature at this time, the more sufficient are decarbonation and dehydration. However, if the temperature is too high with nanoparticle zinc oxide, sintering begins, and many grains become connected. Moreover, the case of there being much residual amount of the carbonic acid and bonding water with low temperature treatment is a main cause for hindering sintering when the sintering is performed. When weight reduction while decarbonating and dehydrating the basic zinc carbonate is between 97.0% and 99.5% of the weight reduction rate in the case of heat treatment at 600° C., it is understood to be a range within which the connecting state is negligible and is not an obstructing factor for sintering. That temperature thereof is 270 to 450° C., or more preferably 350 to 370° C. When connections increase, untamped density and tap density stipulated in the form of the zinc oxide powder used for the aforementioned zinc oxide varistor of the present invention cannot be achieved, and non-uniform grain growth and closed pores generate, thereby not forming a dense sintered body.

(6) Furthermore, while synthesis of the basic zinc carbonate, which is the precursor of the zinc oxide powder used for the zinc oxide varistor of the present invention, differs from prior art as represented by Patent Document 1 and Non-Patent Document 1, it is characteristic of synthesizing at ambient temperature and generating flakes, and it is unusual for the flakes typically called a rose structure to have an integrated structure, that is it has poor crystallinity. Therefore, not many connected grains are formed even if the precursors according to the present invention are heat treated. As is understood from the SEM photographs given in FIG. 1, planar connected forms left as marks of the flake-formed precursors can be seen in Comparative Example 3. If many of such connected grains exist, grain growth accelerates in that part, and thus the sintered body is formed with non-uniform grain size.

(7) Moreover, while with synthesis of basic zinc carbonate, which is the precursor of the zinc oxide powder used for the zinc oxide varistor of the present invention, crystallinity with 100% yield of zinc due to precipitation under high alkalinity is also generally good, precipitate is obtained under a condition of less than 100% and 96% or greater yield of zinc, and crystallinity also becomes poor (increase in peak half value, etc.) when a precipitation reaction occurs in a state where the pH is maintained constant at a relatively low alkalinity. In prior art, marks of the precursor form are left after heat treatment due to the thick flake shape and a rose structure that have excellent precursor crystallinity, which in turn also generates connected grains, non-uniform grain growth, and some coarse crystal grains. This is also given in Table 4 along with the above-given technical matters (4) to (6). It can be seen from the crystallite size and number of SEM observed particles sintered at 1000° C. and 1150° C., respectively, that the zinc oxide sintered body using the zinc oxide powder used for the zinc oxide varistor of the present invention has grain growth of the sintered grains controlled, and size is uniform without showing any abnormal grain growth, where in turn the powder is excellent for making a highly dense, highly strong sintered body.

[Working Example]

A process of synthesizing basic zinc carbonate, which is the precursor of the zinc oxide powder used for the zinc oxide varistor of the present invention, a process of heat-treating the precursor and making a zinc oxide powder, and a method of manufacturing the a zinc oxide sintered body from the zinc oxide powder and an evaluation thereof are described using the working example and comparative examples, but the present invention is not limited to these specific examples.

<Synthesis of Precursor>

[Precursor Synthesis Example 1]

Zinc nitrate hexahydrate (manufactured by Kishida Chemical Co., Ltd.) as a zinc source, ammonium carbonate (manufactured by Kishida Chemical Co., Ltd.) as a carbonic acid source, and 30 wt % sodium hydroxide (manufactured by Kishida Chemical Co., Ltd.) as alkali are used. Solutions using pure water are prepared, one having 0.5M zinc nitrate in 1 L solution, and another having 0.4M ammonium carbonate in 0.5 L solution in a 2 L beaker. A pH electrode for controlling the pH is put in the ammonium carbonate solution, and the zinc nitrate solution is dripped at a speed of 1 L/hr. By dripping the 30 wt % sodium hydroxide into the ammonium carbonate solution using a liquid feeding pump, which is turned on/off by a pH controller (TDP-51 manufactured by Toko Kagaku Kenkyujo Co., Ltd.) in order to prevent the pH of the ammonium carbonate solution from dropping as a result of dripping the zinc nitrate solution, which is acidic, the pH of the ammonium carbonate solution is maintained at a constant of pH 7.5 while dripping the zinc nitrate solution.

Once liquid feeding is completed, it is stirred and cured for 20 hours so as to make a precursor basic zinc carbonate slurry. A cooling device is installed so that the temperature of the ammonium carbonate solution is always under 30° C. during this precipitation producing reaction and during stirring and curing.

The cured slurry is subjected to solid-liquid separation using a suction filtration method, and in order to rinse and remove unnecessary sodium, etc., the solid content is subjected to a reslurry process using an appropriate amount of pure water and then to solid-liquid separation using the suction filtration method. This rinsing process is repeated four times.

The rinsed solid content is vacuum-dried at 30° C. for 20 hours in a vacuum drying machine so as to make a dried powder of the basic zinc carbonate, which is the precursor.

Mineral phase identification by X-ray diffraction (D8 ADVANCE manufactured by Bruker Co., Ltd.) and measurement (using the Debye-Scherrer method) of crystallite size is conducted on the resulting precursor basic zinc carbonate. Moreover, measurement of heat reduction using TG-DTA (TG/DTA 6300 manufactured by Hitachi High-Technologies Corporation), carbon analysis (C5844 manufactured by Leco Corporation) using a combustion method, and Zn and Na analysis using ICP (ICP-9000 manufactured by Shimadzu Corporation) are conducted.

It is understood from the results of the X-ray diffraction and component analysis that the obtained precipitate is basic zinc carbonate having hydrozincite ($Zn_5(CO_3)_2(OH)_6 \cdot 2H_2O$) as the main constitutive substance. Precipitate yield at this time is 98%. Furthermore, it is understood that a heat reduction due to decarbonation and dehydration ends at approximately 600° C.

[Precursor Synthesis Example 2]

The same manufacturing process as in Precursor Synthesis Example 1 is carried out, except that hydrozincite of the precursor is synthesized using sodium hydrogen carbonate as a carbonic acid source.

[Precursor Synthesis Example 3]

Aside from making the pH be 6.0 and 8.5 at the time of synthesis, synthesis is performed under the same conditions as Precursor Synthesis Example 1. While the precipitate is basic carbonate having hydrozincite as the main constitutive substance in either case, small amount of precipitate is obtained at pH 6.0, and it is understood from analysis of the solution that yield is approximately 20%, making economic efficiency remarkably low. At pH 8.5, yield is 100% and the same results as in the working example are achieved.

[Precursor Synthesis Example 4]

Synthesis is carried out according to Patent Document 1 and Non-Patent Document 1. The zinc source is changed from zinc chloride to zinc nitrate, the carbonic acid source is kept as sodium hydrogen carbonate, and the precipitation reaction occurs by adding sodium hydroxide to the solution made from zinc nitrate and sodium hydrogen carbonate while stirring so as to make pH 8.5. The precipitation reaction occurs while keeping the temperature of the container at 40 to 60° C. The obtained precipitate is basic carbonate having hydrozincite as the main constitutive substance, as in the working example, and precipitate yield is nearly 100%.

[Precursor Synthesis Example 5]

Aside from using anhydrous zinc chloride (manufactured by Kishida Chemical Co., Ltd.) as a zinc source and ammonium carbonate as a carbonic acid source, synthesis is carried out under the same conditions as Precursor Synthesis Example 1. While the obtained precipitate is basic carbonate having hydrozincite as the main constitutive substance as in Precursor Synthesis Example 1, and precipitate yield is 99%. Moreover, it is understood from component analysis that the chlorine residue is approximately 1.6% (the chlorine residue within zinc oxide after decarbonation and dehydration), which is high.

<Heat Treatment>

The basic zinc carbonate synthesized in the aforementioned precursor synthesis examples is put in an aluminum crucible and heat-treated at 360° C. in an atmospheric environment. Temperature raising rate is set to 2° C./min, retention time at 360° C. is six hours, and cooling is natural cooling. Measurement results of weight reduction after heat treatment are given in Table 1. Weight reduction rate is represented by a relative value where weight reduction rate in the case of heat treating at 600° C. is assumed to be a standard of 100%. Moreover, measurement of specific surface area by a BET adsorption process (AUTOSORB-MP1 manufactured by Quantachrome Instruments) is carried out. Measurement of untamped density and tap density stipulated by the JIS method is also carried out. Grain diameter calculated from BET surface area and measurement results of untamped density and tap density are given in Table 1. With heat treatment at 360° C., reduction rate is 98.5 to 99.9%, where differences in manufacturing conditions are not recognized. Powder filling density is highest in Working Example 1, which is the heat treated object of Precursor Synthesis Example 1. Moreover, measurement of grain size distribution using a dynamic scattering method (SZ-100 manufactured by Horiba Ltd.) is carried out. Results of grain size distribution measurement are given in Table 2. While grain diameter (median diameter) is within 30 to 60 nm, it is understood that the grain size distribution of Working Example 1, which is the heat treated object of Precursor Synthesis Example 1, is sharp, as can be understood from the cumulant polydispersity index.

TABLE 1

Powder characteristics after heat treatment[*1]

| | Precursor used | Weight reduction rate[*2] (%) | BET diameter (nm) | Untamped density (g/cm³) | Tap density (g/cm³) |
|---|---|---|---|---|---|
| Working Example 1 | Precursor Synthesis Example 1 | 99 | 30 | 0.430 | 0.699 |
| Comparative Example 1 | Precursor Synthesis Example 2 | 99.4 | 23 | 0.237 | 0.378 |
| Comparative Example 2[*3] | Precursor Synthesis Example 3 | 98.5 | 31 | 0.241 | 0.410 |

TABLE 1-continued

Powder characteristics after heat treatment*[1]

|  | Precursor used | Weight reduction rate*[2] (%) | BET diameter (nm) | Untamped density (g/cm³) | Tap density (g/cm³) |
|---|---|---|---|---|---|
| Comparative Example 3 | Precursor Synthesis Example 4 | 99.9 | 30 | 0.222 | 0.382 |
| Comparative Example 4 | Precursor Synthesis Example 5 | 99.8 | 34 | 0.224 | 0.373 |

*[1] Powder heat-treated at 360° C.
*[2] Relative value when weight reduction rate in the case of heat treating at 600° C. is assumed to be a standard of 100%
*[3] Sample of Comparative Example 2 is synthesized at pH 8.5

TABLE 2

|  | Precursor used | Median diameter (nm) | Cumulant diameter (nm) | Cumulant polydispersity index |
|---|---|---|---|---|
| Working Example 1 | Precursor Synthesis Example 1 | 34.1 | 54.0 | 0.053 |
| Comparative Example 1 | Precursor Synthesis Example 2 | 38.1 | 49.6 | 0.118 |
| Comparative Example 2*[2] | Precursor Synthesis Example 3 | 57.9 | 82.0 | 0.221 |
| Comparative Example 3 | Precursor Synthesis Example 4 | 47.9 | 139.5 | 0.300 |
| Comparative Example 4 | Precursor Synthesis Example 5 | 39.1 | 56.0 | 0.313 |

*[2] Sample of Comparative Example 2 is synthesized at pH 8.5

<Evaluation of Heat Treatment Temperature Dependency of Zinc Oxide Powder>

Zinc oxide powder is manufactured by changing the heat treatment temperature of the basic zinc carbonate as a precursor, and heat treatment temperature dependency characteristic of the zinc oxide powder is evaluated.

In the above heat treatment example, conditions aside from making the maximum temperature be 200 to 550° C. are the same as in the aforementioned heat treatment example. Temperature dependency of weight reduction due to heat treatment of the zinc oxide powder that is obtained through heat treatment of the basic zinc carbonate synthesized in Precursor Synthesis Examples 1 and 4, grain diameter (BET diameter) calculated from the BET surface area, and untamped density and tap density are collected in Table 3. In Thermal Treatment Example 1-Working Example 1 (using Precursor Synthesis Example 1), it is understood that weight reduction rate is within the range of 97 to 99.5%, crystallite size is small, and filling density is high. In Thermal Treatment Example 2-Precursor Synthesis Example 1, weight reduction is insufficient when the heat treatment temperature is low using the same precursor, and the crystallite size is too large when the heat treatment temperature is too high. If the crystallite size is too large, grain growth at the time of sintering is difficult and becomes a cause of late densification, and is thus unsuitable for sintering at a low temperature. In Thermal Treatment Example 3-Precursor Synthesis Example 4, it is understood that compared to Working Example 1, the crystallite size is large when the filling density is low and heat treatment is performed at a high temperature.

TABLE 3

| Heat treatment example | Basic zinc carbonate precursor used | Heat treatment temperature (° C.) | Weight reduction rate*[1] (%) | BET diameter (nm) | Untamped density (g/cm³) | Tap density (g/cm³) | Crystallite size (nm) |
|---|---|---|---|---|---|---|---|
| Heat Treatment Example 1 (Working Example 1) | Precursor obtained in Precursor Synthesis Example 1 | 270 | 97.5 | 18 | 0.372 | 0.58 | 14 |
|  |  | 360 | 99 | 30 | 0.382 | 0.624 | 27 |
|  |  | 450 | 99.4 | 58 | 0.5 | 0.98 | 55 |
| Heat Treatment Example 2 | Precursor obtained in Precursor Synthesis Example 1 | 200 | 94 | 5 | 0.25 | 0.322 | 4 |
|  |  | 230 | 97 | 10 | 0.275 | 0.424 | 9 |
|  |  | 470 | 99.6 | 65 | 0.475 | 0.833 | 65 |
|  |  | 550 | 99.9 | 102 | 0.575 | 1.054 | 140 |
| Heat Treatment Example 3 | Precursor obtained in Precursor Synthesis Example 4 | 360 | 99.9 | 30 | 0.222 | 0.382 | 32 |
|  |  | 230 | 98 | 15 | 0.27 | 0.3 | 14 |
|  |  | 470 | 99.9 | 70 | 0.35 | 0.4 | 85 |

<Manufacturing and Evaluation of Sintered Body>
[Sintering Example]

A powder of zinc oxide resulting from heat treatment is put through a 0.6 mm sieve and simply crushed, and pressure of approximately 60 MPa is applied so as to manufacture molded bodies of a 20 mm in diameter×2 mm disc shape and a 40×40×5 mm plate shape. In the working example, granulation is not carried out using a spray dryer or the like. This uses only samples that are decarbonated and dehydrated as a result of heat treatment, thereby making clear the influence on the sintered body led by differences in powder characteristics according to precursor synthesis conditions, wherein manufacturing of actual products is not limited thereto.

Five samples of each of these molded bodies are manufactured, highest temperature retention time at 1000° C. and 1150° C., respectively, is six hours, temperature raising rate is set to 4° C./min, cooling is by resting in a furnace, and sintering is conducted in an ambient atmosphere.

Figure 3:
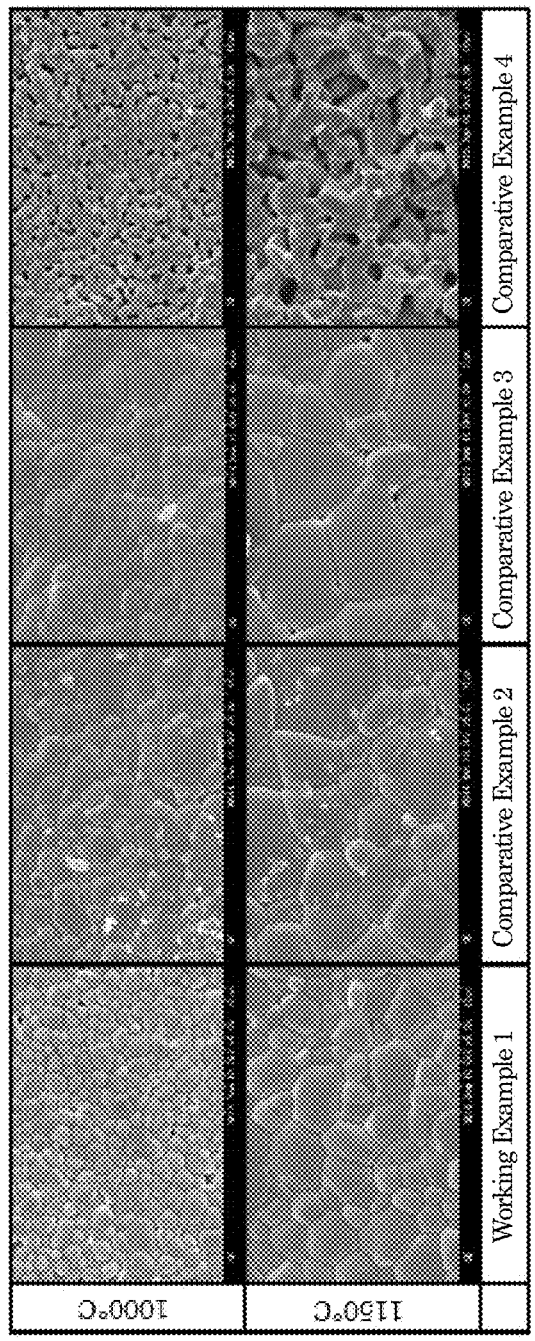
FIG. 3 shows SEM photographs magnified 5 k times the surfaces of sintered bodies, where those sintered bodies are made of zinc oxide powder of Working Example 1 and Comparative Examples 2, 3 and 4, wherein surfaces achieved by sintering at 1000° C. and surfaces achieved by sintering at 1150° C. are compared. The SEM photographs result from measuring number of SEM observed particles.

After sintering, the disc-shaped molded bodies are used as samples for SEM observation, for specific weight measurement using the Archimedes method, for X-ray diffraction, and for heat conductivity measurement using a laser flash method (TC-1200RH manufactured by Advance Riko, Inc.) The plate-shaped molded bodies are processed into 30×4×4 mm rod shapes to be used as samples for bending strength measurement according to ISO178. Crystallite size found through X-ray diffraction, number of SEM observed particles found through SEM observation, and rate of change thereof at 1000° C. and 1150° C. are given in FIG. 3 and Table 4. When crystallite size and number of SEM observed particles at 1000° C. are compared with those at 1150° C., the zinc oxide powder of the present invention shows 8% increase in the crystallite size and 60% decrease in the number of SEM observed particles, grain growth is remarkably further controlled than in the comparative examples, and as a result, it is understood that the zinc oxide powder of the present invention is suitable for obtaining a highly dense, highly strong sintered body. Moreover, while increase in crystallite size is large in Comparative Example 4 containing a large quantity of chlorine, there is further reduction in number of grains as a result of reduction in number of particles within the visual field due to a remarkable increase in voids.

Measurement results of relative density, bending strength, and heat conductivity are given in Table 5. Relative density is low in Comparative Example 4 containing a large quantity of chlorine, and bending strength is small due to insufficient densification. However, since the crystallite size is large, heat conductivity is high. Note that densities here are found by measuring using the Archimedes method. In the table, they are indicated by relative values to the true density 5.61 g/cm$^3$ of zinc oxide.

TABLE 4

Change in grain size at the time of sintering *

| | Precursor used for manufacturing zinc oxide powder | Crystallite size (nm) | | | Number of particles observed using SEM | | |
|---|---|---|---|---|---|---|---|
| | | 1000° C. | 1150° C. | Increase rate(%) 1000→1150 | 1000° C. | 1150° C. | Reduction rate(%) 1000→1150 |
| Working Example 1 | Precursor Synthesis Example 1 | 88 | 95 | 8.0 | 195 | 78 | 60.0 |
| Comparative Example 1 | Precursor Synthesis Example 2 | 115 | 140 | 21.7 | 135 | 35 | 74.1 |
| Comparative Example 2*[1] | Precursor Synthesis Example 3 | 127 | 167 | 31.5 | 119 | 33 | 72.3 |
| Comparative Example 3 | Precursor Synthesis Example 4 | 88 | 101 | 14.8 | 93 | 26 | 72.0 |
| Comparative Example 4 | Precursor Synthesis Example 5 | 80 | 135 | 68.8 | 150 | 20 | 86.7 |

* Powder heat treated at 360° C.
*[1] Sample of Comparative Example 2 is synthesized at pH 8.5

TABLE 5

| | Relative density (%) | | Bending strength (MPa) | | Heat conductivity (W/m · K) | |
|---|---|---|---|---|---|---|
| Sintering temperature (° C.) | 1000 | 1150 | 1000 | 1150 | 1000 | 1150 |
| Working Example 1 | 97 | 98.5 | 128.8 | 147 | 1.8 | 2.1 |
| Comparative Example 1 | 95.5 | 97.5 | 110.6 | 134.9 | 2 | 2.7 |
| Comparative Example 2*[1] | 95 | 97 | 104.6 | 127 | 2.6 | 3 |
| Comparative Example 3 | 96 | 98 | 116.7 | 140.9 | 1.9 | 2.6 |

TABLE 5-continued

|  | Relative density (%) | Bending strength (MPa) | Heat conductivity (W/m · K) |  |  |
|---|---|---|---|---|---|
| Comparative Example 4 | 93 | 94 | 80.4 | 92.5 | 2.1 | 2.6 |

\* Powder heat-treated at 360° C.
\*[1] Sample of Comparative Example 2 is synthesized at pH 8.5

Precursor used for manufacturing zinc oxide powder is the same as in the case of Table 4.

[Examples of Precursor Treatment Temperature Dependency of Sintered Body Characteristics]

The precursor for which heat treatment temperature is changed as shown in the above Table 3 is sintered at 1150° C. Measurement results of relative density, bending strength, and heat conductivity of the obtained sintered body are given in Table 6. Measurement results of relative density, bending strength, and heat conductivity in the case of sintering at the same 1150° C. in the same heat treatment conditions for decarbonation and dehydration as the conditions given in the comparative Thermal Treatment Examples are given in Table 6. All of the examples except for Working Example 1 according to the present invention use the zinc oxide powder of Comparative Example 3. Relative density and bending strength are high in Working Example 1, and heat conductivity is high in Comparative Example 3. Moreover, it is understood that in Working Example 1 and Comparative Example 3, relative density and bending strength are low due to influence of the residual matter when the heat treatment temperature is low, and due to insufficient densification as a result of grain growth associated with increase in crystallite size when heat treatment temperature is high.

TABLE 6

| Heat treatment example | Zinc oxide powder used | Basic zinc carbonate precursor used | Heat treatment temperature (° C.) | Relative density (%) | Bending strength (MPa) | Heat conductivity (W/m · K) |
|---|---|---|---|---|---|---|
| Heat Treatment Example 1 (Working Example 1) | Zinc oxide powder of Working Example 1 | Precursor obtained in Precursor Synthesis Example 1 | 270<br>360<br>450 | 98.5<br>98.5<br>98 | 145<br>147<br>140 | 2<br>2.1<br>2 |
| Heat Treatment Example 2 | Zinc oxide powder of Working Example 1 | Precursor obtained in Precursor Synthesis Example 1 | 200<br>230<br>470<br>550 | 96<br>97<br>97.5<br>96 | 116.7<br>128.8<br>134<br>116 | 1.8<br>1.9<br>2<br>1.8 |
| Heat Treatment Example 3 | Zinc oxide powder of Comparative Example 3 | Precursor obtained in Precursor Synthesis Example 4 | 360<br>230<br>470 | 98<br>96.5<br>96 | 140.9<br>122.8<br>118 | 2.7<br>2.3<br>2.4 |

\* Sintering conducted at 1150° C.

[Examples of Sintering Temperature Dependency of Sintered Body Characteristics]

Sintered bodies are made by sintering in the same manner as in Working Example 1 and Comparative Example 3, which use the precursor synthesis examples and heat treatment example given in Tables 1, 2, and 4, except that sintering is carried out at the maximum temperature between 600 to 1300° C., and the same characteristic evaluation as described above is then conducted so as to examine the influence of the sintering temperature on sintering characteristics of the zinc oxide powder used for the zinc oxide varistor of the present invention in the sintering example. Comparison with only Comparative Example 3 is given. Major attributes at the sintering temperatures between 600 to 1300° C. are collected in Table 7.

TABLE 7

| Sintering temperature (° C.) | Relative density (%) | | Bending strength (MPa) | | Heat conductivity (W/m · K) | |
|---|---|---|---|---|---|---|
| | Working Example 1 | Comparative Example 3 | Working Example 1 | Comparative Example 3 | Working Example 1 | Comparative Example 3 |
| 600 | 80 | 70 | — | — | 0.1 | 0.09 |
| 900 | 92 | 90 | 68.2 | 44 | 1.1 | 0.8 |
| 1000 | 97.5 | 96 | 134.9 | 115 | 1.6 | 1.9 |

TABLE 7-continued

| Sintering temperature (° C.) | Relative density (%) | | Bending strength (MPa) | | Heat conductivity (W/m · K) | |
|---|---|---|---|---|---|---|
| | Working Example 1 | Comparative Example 3 | Working Example 1 | Comparative Example 3 | Working Example 1 | Comparative Example 3 |
| 1150 | 98.5 | 98 | 147 | 140.9 | 2.1 | 2.7 |
| 1200 | 99 | 98.5 | 153 | 144 | 2.2 | 2.9 |
| 1300 | 99.5 | 99 | 155 | 148 | 2.3 | 3 |

* Powder heat-treated at 360° C.

[Evaluation of Working Example and Manufacturing Conditions Thereof]

The zinc oxide powder of Working Example 1 has a crystallite size of 20 to 50 nm found by X-ray diffraction, grain diameter of 15 to 60 nm found using the BET method, untamped density of 0.38 to 0.50 g/cm$^3$, and tap density of 0.50 to 1.00 g/cm$^3$, more preferably within the range of 0.60 to 1.00 g/cm$^3$. Alternatively, with median diameter between 30 nm and 60 nm found using the dynamic scattering method, cumulant diameter between 40 to 82 nm, and cumulant polydispersity index between 0.05 and 0.20, more preferably within the range of 0.05 to 0.15, even further preferably within the range of 0.05 to 0.12, densification can be satisfied until 1000° C. of the sintering temperature of the sintered body. Moreover, even if it is at 1150° C., a highly strong sintered body can be formed because both of the increasing rate of crystallite size and reduction rate of number of SEM observed particles are less than those in the comparative examples.

It is understood that the following conditions allow easy manufacturing so as to obtain a zinc oxide powder having such characteristics. However, while the method of manufacturing the zinc oxide powder used for the zinc oxide varistor of the present invention is not limited to the following manufacturing method, other manufacturing methods may be used, and then the manufactured object may be crushed, classified, and adjusted in grain size distribution, for example, so as to select the zinc oxide powder to be used for the zinc oxide varistor of the present invention. Even with these methods, the obtained zinc oxide powder is within the scope of the present invention as long as it is within the scope of the claims of this invention.

(1) Even with almost the same crystallite size found by the X-ray diffraction and almost the same grain diameter found using the BET method, as long as selecting and using as a carbonic acid source, ammonium carbonate from already known base materials such as sodium hydrogen carbonate (sodium bicarbonate), sodium carbonate, ammonium carbonate, etc., instead of sodium hydrogen carbonate as described in Patent Document 1 and Non-Patent Document 1, and using the same other conditions, highly untamped density and tap density are obtained, contributing to densification during low temperature sintering. This is also clear through SEM observation after heat treatment shown in FIG. 1.

(2) In order to obtain the aforementioned high untamped density and tap density in the working example, the precursor heat treatment temperature of 360° C. at which 0.5% to 3.0% carbonate ions and bonding water remain is suitable. However at a temperature lower than this, sintering is hindered due to decarbonation and dehydration at the time of sintering. At a temperature higher than this, bonding of primary particles begins, thereby increasing connected grains. This results in influencing more than just lowering tap density. Large connected grains grow quickly, becoming larger sintered grains, which is a phenomenon known as Ostwald ripening, causing non-uniform grain size of the sintered body.

A precursor that makes it difficult for connected grains to form after processing is desired. However, with the present invention, it is discovered that the zinc oxide precursor preferably uses ammonium carbonate as a base material, as well as low-alkaline synthesis at ambient temperature. Synthesis is conducted at high temperatures and high alkalinity in Patent Document 1 and Non-Patent Document 1; however, after heat treatment, as illustrated in the SEM photographs of FIG. 1, connected grains are formed in a state where zinc oxide particles leave marks of a flake shape, which is the form of the precursor, or of a rose structure made from integrated flake shapes. With the present invention, while precipitation yield and crystallinity of the precursor are decreased, zinc oxide particles leaving marks of a flake shape, which is the form of the precursor, or of a rose structure made from integrated flake shapes can be prevented.

2. Zinc Oxide Varistor

Details of the zinc oxide varistor according to the embodiment of the present invention are described next.

(1) Manufacturing Method of Zinc Oxide Varistor

Figure 4:
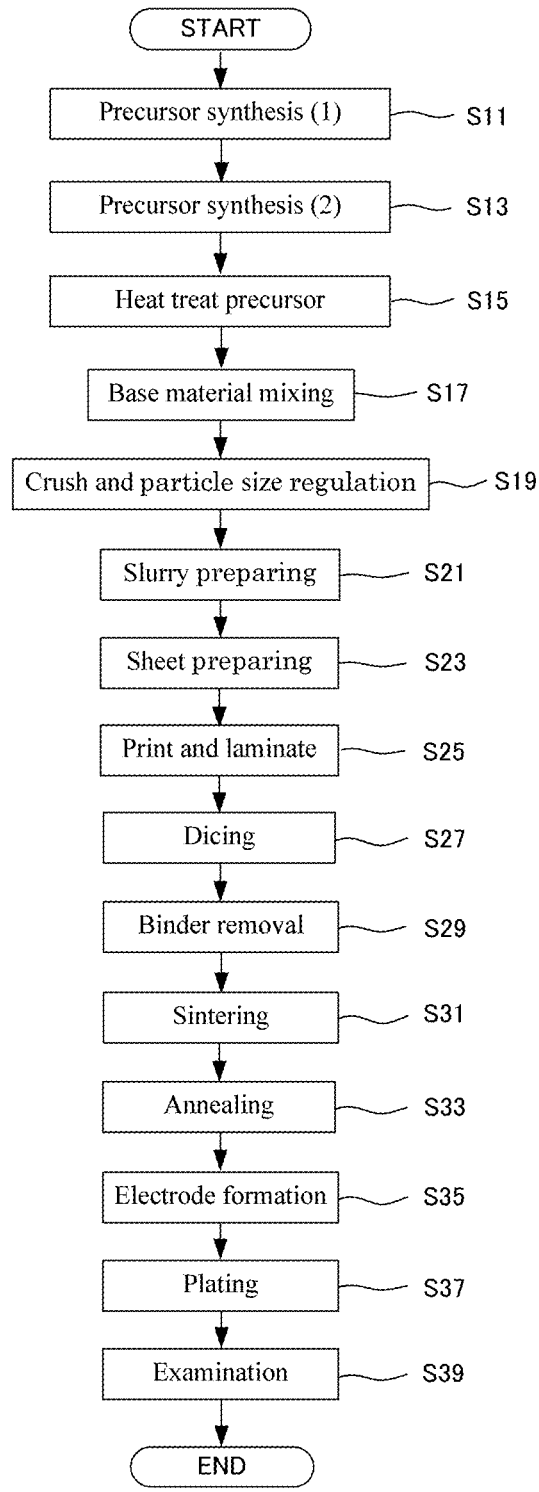
FIG. 4 is a flowchart showing in a time sequence a manufacturing process of a zinc oxide varistor according to an embodiment of the present invention.

FIG. 4 is a flowchart showing in a time sequence a manufacturing process of a zinc oxide varistor (laminated varistor) according to the embodiment of the present invention, wherein focus is on the zinc oxide base material itself, and the zinc oxide powder constituted by the aforementioned grain size, tap density, etc. is used.

To begin with, base material for a zinc oxide varistor is manufactured. To do so, synthesis (1) of a precursor is carried out in step S11 of FIG. 4. More specifically, with the use of zinc nitrate hexahydrate, ammonium carbonate, and sodium hydroxide as described above, and pH of the ammonium carbonate is controlled at 7.5, a basic zinc carbonate slurry that becomes a precursor is made using a liquid-phase method. In the following step S13, synthesis (2) of a precursor is carried out. That is, the basic zinc carbonate slurry obtained in step S11 is subjected to solid-liquid separation by suction filtration. Afterwards, the resulting unnecessary sodium is rinsed and removed, and the solid content after rinsing is vacuum dried at 30° C. for 20 hours so as to make a dried powder of the basic zinc carbonate, which is the precursor.

In step S15, the basic zinc carbonate obtained in step S13 is put in an aluminum crucible and heat treated at 360° C. for six hours in an atmospheric environment. Zinc oxide (ZnO) satisfying the aforementioned crystallite size, grain diameter, untamped density, tap density, etc. is obtained through the process of steps S11 to S15.

In step S17, base material for a zinc oxide varistor is prepared and weighed. Here, either 0.5 mol % of an oxide made of either bismuth (Bi) or praseodymium (Pr) or 0.5 mol % of an oxide including both Bi and Pr is added as an additive to 100 mol % zinc oxide obtained in the above steps. 0.5 mol % of one or more oxides of cobalt (Co), manganese (Mn), and nickel (Ni), which are transition metal elements, is then added. Moreover, either 0.2 mol % or 0.001 mol % of one or more oxides of boron (B), gallium (Ga), and aluminum (Al), which are donor elements, is further added to this composition. Donor elements induce reduction in resistance of the zinc oxide in the zinc oxide varistor, and contribute to improvement in impulse resistance etc. Note that a different form of the aforementioned additives than oxides may be added.

In step S19, the varistor base material weighed as described above is crushed and sized in a ball grinder etc., and in the following step S21, a plasticizing agent, a dispersing agent, a dilution solvent, etc. are added to manufacture slurry. Then, in step S23, the slurry manufactured in step S21 is formed into a film with a doctor blade, manufacturing a green sheet of approximately 10 to 100 μm, for example.

In step S25, a capacitor pattern is printed using an electrode paste of platinum (Pt), palladium (Pd), Ag/Pd, etc., for example, and a laminated body of multiple layers including the green sheet on which an internal electrode is formed, is thermocompressed and bonded using a hot press or the like so as to be laminated. In the subsequent step S27, the laminated green sheet is cut to fit a predetermined product size and then diced.

In step S29, the laminated body after dicing is retained for ten hours at 500° C., for example, and the binder is removed. Then, in step S31, baking is carried out at 900° C., for example. Upon observation of a cross-section of the sintered body, which has resulted from such low temperature sintering, using a scanning electron microscope (SEM), grains of the zinc oxide do not grow abnormally, size and form are uniform, and a dense structure with few voids between zinc oxide grains are confirmed. As a result, the sintered body of zinc oxide has high bending strength (high strength) and high electric conductivity.

In step S33, the aforementioned sintered body is annealed at 700° C., for example. Then in step S35, a terminal electrode (external electrode) is formed using Ag paste or Ag/Pd paste, and baked at a predetermined temperature. Note that R formation (beveling) of the grains in a centrifugal barrel using an abrasive etc. may be carried out after the annealing process.

In step S37, plating on the external electrode formed in the above step S35 is carried out by electroplating in order of Ni layer, Sn layer, for example. Next in step S39, electrical characteristics such as varistor voltage, and surge current (impulse resistance), are examined, completing the zinc oxide varistor.

(2) Evaluation of Zinc Oxide Varistor

Figure 5:
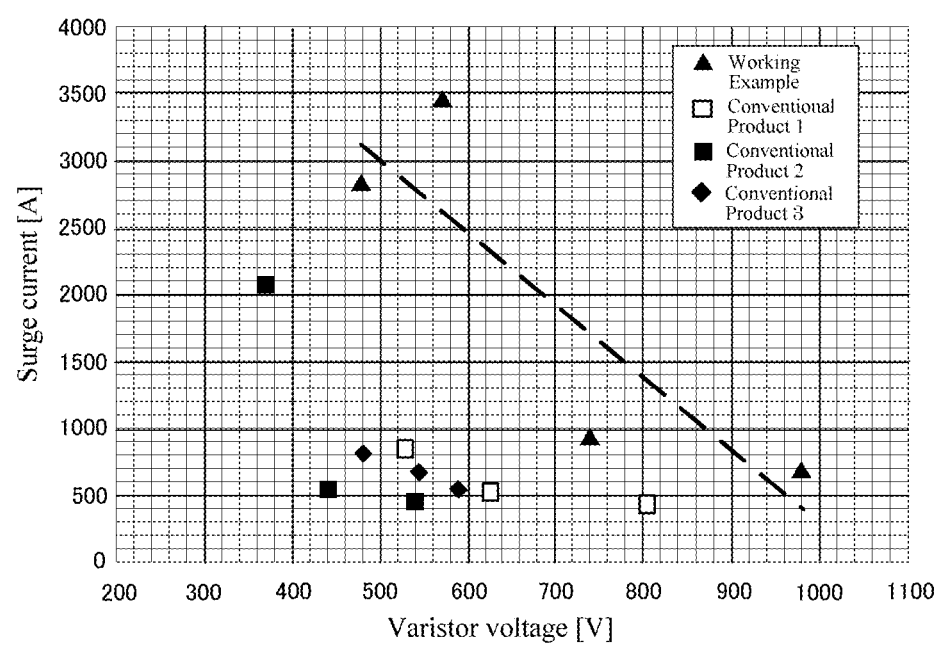
FIG. 5 is a graph showing evaluation results of the zinc oxide varistor according to the embodiment.

FIG. 5 is a graph showing evaluation results of the zinc oxide varistor manufactured through the processes described above. For performance evaluation, bulk-shaped samples having an element size of 9.8 mm×5 mm×1.9 mm and electrode dimensions of 7.5 mm×3.4 mm are used. Since varistor voltage and surge current are correlated, here, as shown in FIG. 5, the zinc oxide varistor according to the embodiment and conventional products 1 to 3 are compared, wherein the horizontal axis gives varistor voltages, and the vertical axis gives surge currents. Conventional Product 1 is a zinc oxide varistor using JIS grade powder manufactured using the French method. Conventional Product 2 is a zinc oxide varistor using a powder of dried basic zinc carbonate synthesized in Comparative Example 4 (Precursor Synthesis Example 5), and Conventional Product 3 is a zinc oxide varistor using a powder of dried basic zinc carbonate synthesized in Comparative Example 1 (Precursor Synthesis Example 2).

It is understood from the evaluation results given in FIG. 5, that the characteristics of the zinc oxide varistor according to the embodiment (presented by a broken line in the graph where the straight-line approximation is applied to ▲ marks) have high surge performance, and even with any of the varistor voltages, have more excellent surge current resistance than those of Conventional Products 1 to 3. Moreover, even if the zinc oxide varistor according to the embodiment is the same in size, the maximum surge performance three times or greater than the conventional products may be achieved. This means that even if the element is miniaturized to ⅓, the same performance as the conventional products may be secured.

With the zinc oxide varistor according to the embodiment as described above, a specified quantity of an additive is contained in either zinc oxide, which is a varistor material, having a crystallite size of 20 to 50 nm, grain diameter of 15 to 60 nm found using the specific surface area BET method, untamped density of 0.38 to 0.50 g/cm$^3$, tap density of 0.50 to 1.00 g/cm$^3$, more preferably within the range of 0.60 to 1.00 g/cm$^3$, or zinc oxide having median diameter of 30 to 60 nm found using the dynamic scattering method, cumulant diameter of 40 to 82 nm, and cumulant polydispersity index of 0.05 to 0.20, more preferably within the range of 0.05 to 0.15, even further preferably within the range of 0.05 to 0.12. Since as a result there is no abnormal grain growth and few voids between grains in the zinc oxide sintered body, the sintered grain size is uniform with high compactness, and thus a zinc oxide varistor having high surge resistance and low clamping voltage while securing high strength and high electric conductivity may be obtained.

Moreover, a dense zinc oxide sintered body may be obtained by lowering the sintering temperature, that is, by low-temperature sintering at 900° C. or less due to the heat shrinkage behavior at the time of sintering, thereby allowing elimination of use of rare metals such as Pd, Au, Pt, and lowering cost of the varistor. Furthermore, since it has three or more times the surge performance than the conventional products even with the same size, the varistor may be miniaturized while securing the same performance as the conventional products.

Note that one or more kinds of an oxide of antimony (Sb) and chromium (Cr) for suppressing and controlling grain growth may be added as an additive to the base material mixture for the zinc oxide varistor of the embodiment. Moreover, silica glass composition (SiO$_2$ system) may be added as a glass component for stabilizing sintering.

The invention claimed is:

1. A zinc oxide varistor, comprising zinc oxide (ZnO) as a main component, one or more additives selected as a grain boundary forming component selected from the group consisting of bismuth (Bi) and praseodymium (Pr) and mixtures thereof, and one or more additives selected as a transition metal element selected from the group consisting of cobalt (Co), manganese (Mn) and nickel (Ni) and mixtures thereof;

wherein the zinc oxide has a crystallite size of 20 to 50 nm found by X-ray diffraction, grain diameter of 15 to 60 nm found using a specific surface area BET method, untamped density of 0.38 to 0.50 g/cm$^3$, and tap density of 0.50 to 1.00 g/cm$^3$.

2. The zinc oxide varistor according to claim 1, wherein crystallite size when powder of the zinc oxide is sintered at 1000° C. is 70 to 1200 nm, and crystallite size when sintered at 1150° C. is 75 to 170 nm.

3. The zinc oxide varistor according to claim 2, wherein increasing rate of the crystallite size of the zinc oxide by sintering within the range of 1000° C. and 1150° C. is 10% or less.

4. The zinc oxide varistor according to claim 1, further comprising one or more donor elements selected from the group consisting of aluminum (Al), boron (B), and gallium (Ga), and mixtures thereof.

5. A zinc oxide varistor, comprising zinc oxide (ZnO) as a main component, one or more additives selected as a grain boundary forming component selected from the group consisting of bismuth (Bi) and praseodymium (Pr) and mixtures thereof, and one or more additives selected as a transition metal element selected from the group consisting of cobalt (Co), manganese (Mn) and nickel (Ni), and mixtures thereof;
wherein the zinc oxide has median diameter of 30 to 60 nm found using a dynamic scattering method, cumulant diameter of 40 to 82 nm, and cumulant polydispersity index of 0.05 to 0.20.

6. The zinc oxide varistor according to claim 5, wherein crystallite size when powder of the zinc oxide is sintered at 1000° C. is 70 to 1200 nm, and crystallite size when sintered at 1150° C. is 75 to 170 nm.

7. The zinc oxide varistor according to claim 6, wherein increasing rate of the crystallite size of the zinc oxide by sintering within the range of 1000° C. and 1150° C. is 10% or less.

8. The zinc oxide varistor according to claim 5, wherein one or more donor elements selected from the group consisting of aluminum (Al), boron (B), and gallium (Ga), and mixtures thereof, is further added.

9. A manufacturing method of a zinc oxide varistor, comprising the steps of:
manufacturing basic zinc carbonate slurry that is a first precursor of zinc oxide (ZnO) powder;
obtaining from the first precursor a dried powder of basic zinc carbonate that is a second precursor of zinc oxide (ZnO) powder;
obtaining zinc oxide (ZnO) through heat treatment of the second precursor;
manufacturing a mixed material resulting from adding a predetermined additive to the zinc oxide (ZnO); and
forming a varistor element for a zinc oxide varistor from the mixed material,
wherein the zinc oxide varistor comprises zinc oxide (ZnO) as a main component, one or more additives selected as a grain boundary forming component selected from the group consisting of bismuth (Bi) and praseodymium (Pr) and mixtures thereof, and one or more additives selected as a transition metal element selected from the group consisting of cobalt (Co), manganese (Mn) and nickel (Ni) and mixtures thereof; and
the zinc oxide has a crystallite size of 20 to 50 nm found by X-ray diffraction, grain diameter of 15 to 60 nm found using the specific surface area BET method, untamped density of 0.38 to 0.50 g/cm$^3$, and tap density of 0.50 to 1.00 g/cm$^3$.

10. The manufacturing method of a zinc oxide varistor according to claim 9,
wherein the zinc oxide varistor comprises zinc oxide (ZnO) as a main component, one or more additives selected as a grain boundary forming component selected from the group consisting of bismuth (Bi) and praseodymium (Pr) and mixtures thereof, and one or more additives selected as a transition metal element selected from the group consisting of cobalt (Co), manganese (Mn) and nickel (Ni), and mixtures thereof; and
the zinc oxide has median diameter of 30 to 60 nm found using a dynamic scattering method, cumulant diameter of 40 to 82 nm, and cumulant polydispersity index of 0.05 to 0.20.

11. The manufacturing method of a zinc oxide varistor according to claim 10, wherein one or more donor elements selected from the group consisting of aluminum (Al), boron (B), and gallium (Ga), and mixtures thereof, is further added.

12. The manufacturing method of a zinc oxide varistor according to claim 9, wherein one or more donor elements selected from the group consisting of aluminum (Al), boron (B), and gallium (Ga), and mixtures thereof, is further added.

* * * * *